G. B. TURNER & J. A. VAUGHN.

Grain Winnower.

No. 3,923. Reissued April 19, 1870.

Witnesses:

Henry K. Wygatt,
Edmund Mason.

Inventor:

G. B. Turner.
By A. B. Stoughton. atty.

N. PETERS. Photo-Lithographer. Washington. D. C.

United States Patent Office.

GRANT B. TURNER, OF CUYAHOGA FALLS, OHIO, ASSIGNEE OF GRANT B. TURNER AND JAMES A. VAUGHN.

*Letters Patent No.* 1,013, *dated April* 9, 1861; *reissue No.* 3,923, *dated April* 19, 1870.

IMPROVED GRAIN-SEPARATOR.

The Schedule referred to in these Letters Patent and making part of the same.

*To all whom it may concern:*

Be it known that GRANT B. TURNER and JAMES A. VAUGHN, of Cuyahoga Falls, in the county of Summit and State of Ohio, did invent certain new and useful Improvements in Grain-Separators; and that the following is a full, clear, and exact description of the construction and operation of the same, reference being had to the accompanying drawings, in which—

Similar letters of reference, where they occur in the separate figures, denote like parts of the machine in all the drawings.

Figure 1:
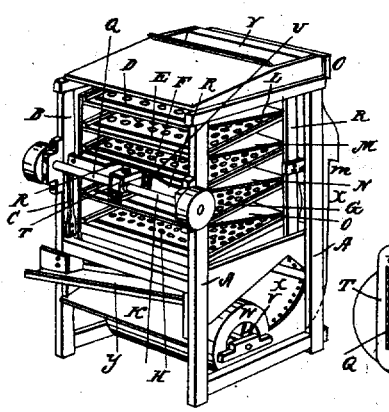
Figure 1 represents, in perspective, a view of the interior of the separator, the sides and ends being removed for that purpose.
Figure 2:
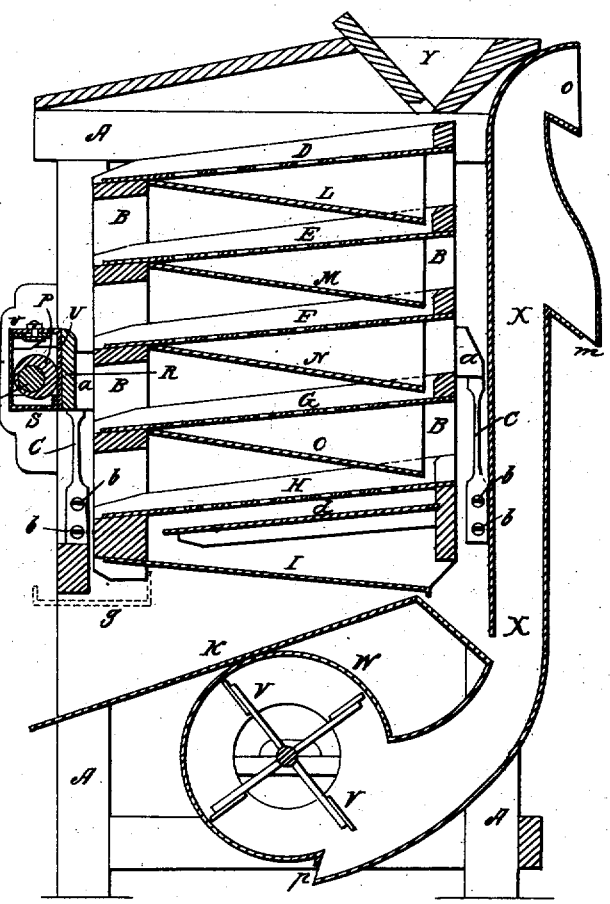
Figure 2 represents, on an enlarged scale, a vertical section through the machine.
Figure 3:
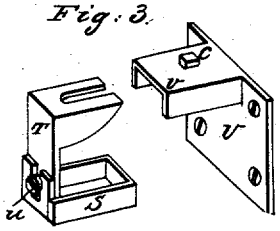
Figure 3 represents, in perspective, a part of the mechanism by which a shake motion may be given to the riddles.

This invention relates first to the arrangement of a series of riddles inclined in one direction, with a series of directing boards inclined in an opposite direction, and so that the grain shall pass from one series to or over the other series, and be separated from lighter material in its transmission.

And the invention further consists in the arrangement, with a series of riddles inclined in one direction and a series of directing boards inclined in an opposite direction, and so that the grain shall drop or be delivered from one to the other of the series, of a shake motion, to agitate and expedite the grain in its passage or transmission over the riddles and directing boards.

And the invention further consists in the arrangement, with a series of riddles inclined in one direction and a series of directing boards inclined in an opposite direction, so that the grain shall pass from one series to the other series in succession, of a fan-blast for making a final separation of the very light material from the grain after the coarser material has been separated from it.

And the invention further consists in the arrangement of a series of riddles inclined in one direction, and a series of directing boards inclined in an opposite direction, so that the grain, &c., shall pass from one series onto the other series, of a shake motion and fan-blast for aiding the transmission and separation of the coarse and fine impurities from the grain.

To enable other skilled in the art to make and use this invention, the following description, in connection with the drawings, is given.

In an exterior frame, A, is arranged a frame, B, in which latter frame is placed a series of screens or riddles, D E F G H, which may be of graduated mesh, and all inclined in the same direction.

Underneath this series of riddles there is placed a series of directing boards, L M N O, all inclined in an opposite direction, and so arranged that the material that passes through one riddle shall, by its directing board, be carried and delivered onto the next riddle of the series, and so on, and the material that does not pass through the riddles shall drop off at the ends of said riddles.

To give this series of inclined riddles and contrary inclined series of directing boards a shake motion, to expedite the separation of the impurities from the grain, and aid the material in its transmission through the series, the frame B may be supported on spring-rods C, or their equivalents, the upper ends of which enter the brackets *a* of the frame B, while their lower ends are secured to the frame A by means of screws *b*, or otherwise.

The directing board *d* underneath the riddle H (which riddle may be deemed as the last one of the series) inclines in the same direction with said riddle, and is designed for carrying the grain, cockle, and such smaller seeds or grains as still remain in the wheat to the upper end of the cockle-riddle I, and which, in passing over said cockle-riddle, is separated from the pure wheat or other grain, and drops through said riddle onto the inclined board K, whence it is carried out of the machine, the wheat passing over said riddle and dropping off at its end.

The perforations in the screens or riddles D E F G H are of such size as will allow the wheat to pass through them, while oats, or other material longer than the diameters of the holes, will pass over the screens, and be dropped at their lower edges into receptacles that conduct them out of the machine. The openings of the screen or riddle I will only admit of the passage through of cockle, imperfect grain, and small seed.

To give the frame B and series of riddles and directing boards a shake motion, the following mechanism may be used, viz:

A cam, P, on a rotating shaft, Q, which cam operates on the plate U or plates U T on the cross-bar R of the frame B, and causes an easy and rapid motion without sudden jar.

A self-oiling device may be applied to the cam P, as follows:

A cup, S, is secured to the plate T by means of the set-screw *u*, and this plate T is slipped into the yoke *v* of the plate U, it being held therein by the head of the bolt *c*. Oil, or cotton waste saturated with oil, is placed in the cup S, and the cam at each revolution takes up a small quantity of oil, and is thus made self-lubricating. The faces of the plates T U may have rubber or leather fixed upon them, against which the cam may work, and thus give an easy motion without blow or jar.

The machine may be further provided with a fan, V, working in a fan-case, W, and with a blast-trunk, X, provided with suitable passages and apertures, which will be more particularly referred to in describing the operation of the machine, which is as follows:

Motion being given to the shaft *x* of the fan, and to the shaft Q by suitable pulleys, belt, or gearing, the grain is fed into the machine through the hopper Y, and passes onto the first screen D. The holes of this screen or riddle should be somewhat larger than the grain, so that the grain as well as some of the coarser impurities may pass through it, while the greater part of the oats, and still coarser impurities pass over its lower edge and out of the machine. The grain, and such impurities as may have passed through the first riddle with it, drop upon the first directing board L of the series, and by it is carried and delivered onto the second riddle E, and at its upper end, so as to cause it to pass over the entire riddle, where another separation takes place, the coarser material passing off at the end of said riddle, while the grain drops through the riddle onto the directing board M, which in turn carries and delivers the grain onto the next riddle F, and so on throughout the series of alternating riddles and directing boards, a separation taking place at each of the series, until the grain drops through the riddle H and onto the directing board *d*, which carries it onto the cockle-riddle I, where the grain is divested of cockle, imperfect grains, and small seeds, which pass off at K.

From the riddle I the wheat may be passed into the trunk X, and subjected to the blast from the fan V, which takes off all the dust, light material, and impurities still remaining in the wheat, the very lightest going off at *o*, the less light at *m*, and the thoroughly cleaned wheat passing out of the trunk at *p*.

The material that does not go through the riddles is received and carried off by the trough *y*. The cockle, broken grains, and small seeds pass out over the board K. The wheat cleaned by the series of screens passes out over the screen I, and, when thrown into a blast or current of air for a still further cleaning operation, the entirely cleaned wheat passes out at *p*, while the lighter and less light impurities taken from the grain by the current of wind pass out respectively at *o* and *m*.

The riddles are of easy access for cleaning should they become clogged, and the machine is inexpensive and very efficient.

Having thus fully described the invention,

What is claimed therein as new, and desired to be secured by Letters Patent, is—

The arrangement of a series of riddles inclined in one direction, with a series of directing boards inclined in an opposite direction, so that the grain shall pass from one series to or over the other series, substantially as and for the purpose described.

Also, in the arrangement, with a series of riddles inclined in one direction and a series of directing boards inclined in the opposite direction, so that the grain shall pass from one onto the other throughout the series, of a shake motion to agitate and expedite the grain in its passage or transmission over the riddles and directing boards, substantially as described.

Also, the arrangement, with a series of riddles inclined in one direction and a series of directing boards inclined in an opposite direction, so that the grain will pass through the series of riddles and be carried from one to the other of the series by the interposed directing boards, of a fan-blast for making a final separation of the very light material from the grain after the coarser material has been taken from it by the series of inclined riddles, substantially as described.

Also, the arrangement, with a series of riddles inclined in one direction and a series of directing boards inclined in an opposite direction, and so as to carry the grain from one to the other of the series, of a shake motion, and a fan-blast for expediting the transmission of the grain through the machine, and for a final separation of the very light material therefrom, substantially as described.

G. B. TURNER.

Witnesses:
JOSHUA THOMAS,
JOHN P. BAUGHER.